Sept. 12, 1933.   J. F. KELLER   1,926,999
FLEXIBLE SHAFT HANDPIECE
Filed Dec. 30, 1929
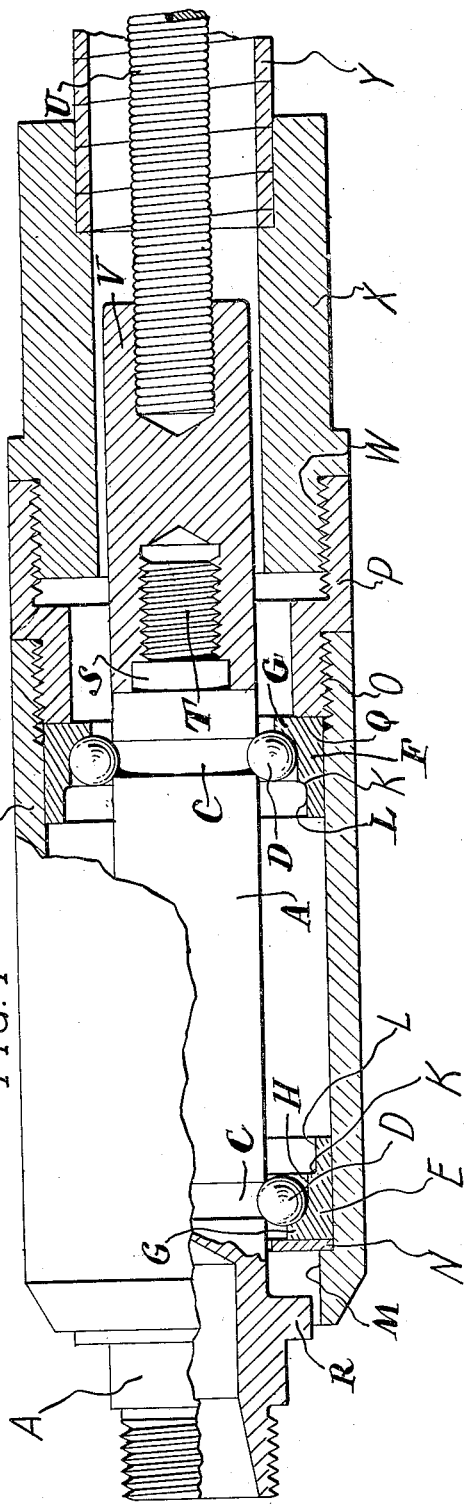
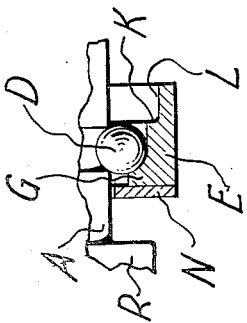
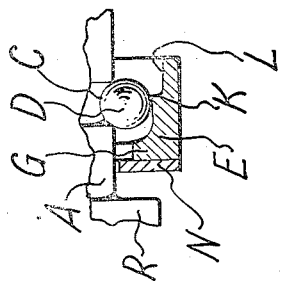
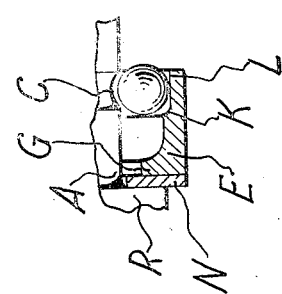
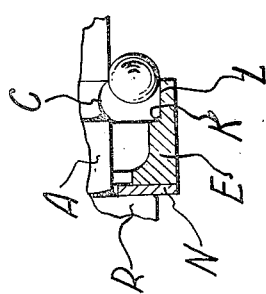
INVENTOR
Joseph F. Keller
BY
M. H. Lockwood
ATTORNEY Patented Sept. 12, 1933

1,926,999

UNITED STATES PATENT OFFICE 1,926,999

FLEXIBLE SHAFT HANDPIECE

Joseph F. Keller, New York, N. Y., assignor, by mesne assignments, to Pratt & Whitney Company, Hartford, Conn., a corporation of New Jersey Application December 30, 1929
Serial No. 417,404

3 Claims. (Cl. 64—30)

This improvement relates to an improved assembly of the ball races on the spindle of a flexible shaft hand piece, so as to eliminate the use of the usual inner ring ball race and thereby reduce the outside diameter of the hand piece.

In mounting spindles in hand pieces heretofore, it has been the practice to mount an ordinary ball bearing unit at each end of the spindle and enclose the outer raceway rings in a cylindrical shell or casing, which may be grasped in the hand for ordinary manual operation of the hand tool.

One object of the present improvement is to provide for greatly reducing the outside diameter of the hand piece shell by using a small diameter spindle and eliminating the inner ball race ring and substituting therefore a ball race formed by turning annular grooves directly on the spindle of the hand piece. In order to attain this object, it is preferable to provide a special form of outer raceway rings which permit assembly of the ball bearings in a novel manner.

A further object of the improvement is to provide novel means for attaching the flexible shaft to the spindle, which becomes desirable upon reduction of the outside diameter of the hand piece and the use of a spindle of smaller diameter. Heretofore, it has been customary to form the spindle of the hand piece with a longitudinal bore and a squared socket for attaching the flexible shaft by inserting a square plug or jack. Obviously, such an arrangement, providing a hollow shaft or socket, necessarily required a spindle of larger diameter, which is obviated in the present instance by having the body of the spindle solid and of smaller diameter and attaching the flexible shaft to the end of the spindle by a screw threaded connection.

One form of the improved hand piece spindle bearing and the method of attaching the flexible shaft is shown in the accompanying drawing, in which Fig. 1 is a plan view of the hand piece shown in partial longitudinal section to show the ball bearings in place and the connection of the flexible shaft; and Figs. 2, 3, 4 and 5 are sectional detail views showing the steps in assembling one of the ball bearings.

Referring to the drawing, it will be seen that the spindle A of the hand piece is preferably formed by turning from a solid bar and providing a special form of connection with a flexible shaft. The spindle A is mounted in a shell B or other suitable casing adapted to form the handle or grip of the hand piece which, in the present instance, is smaller in diameter than usual. In order to provide ball bearings for the spindle and maintain the smaller diameter of the outer shell, the spindle is provided with annular grooves C at each end which are preferably formed by turning the grooves directly in the body of the spindle. In this manner, the necessity for an inner raceway ring is eliminated and a reduction in the diameter of the hand piece is accomplished.

The bearing balls D are held in place in the spindle grooves C and cooperate with outer ball races formed in raceway rings E and F, which are mounted in the outer shell or casing B and supported in position opposite the respective spindle race grooves C, substantially as shown in Fig. 1.

The ball bearing annular raceway rings E and F (substantially identical) are formed with thrust bearing shoulders at G, the bearing surfaces of which merge into the inner cylindrical bearing surfaces H of the raceway rings, as shown in the drawing.

The open ends of the respective rings E and F, that is, the ends opposite the shoulders G, are counterbored to provide inner shoulders K and outwardly projecting skirt portions L of cylindrical or tubular form and of larger internal diameter than the bearing surfaces H, such as to substantially permit the balls to be received therein or enter between the outer periphery of the spindle and the skirt portion of the rings, substantially as indicated in Fig. 2. This arrangement provides a novel means for assembling the balls in the race grooves C on the spindle, the steps of which will be described later.

The raceway rings E and F are mounted in the outer shell or casing B, as shown in Fig. 1, the casing or shell shown being provided with an inwardly projecting shoulder at M, for locating the ring E in proper relation to the spindle race groove C shown at the left in Fig. 1. Preferably a spring washer N is inserted between the ring E and the shoulder M to not provide proper alignment of the ball races, but to resiliently hold the raceway rings. The opposite or rear end of the shell or casing B is screw-threaded at O, and an annular retaining collar P is located therein and provided with a face Q adapted to engage the ring F and hold it in proper relation with the ball race C at the right end of the spindle A as shown in Fig. 1. The collar P incidently in cooperation with the shoulder M and spring washer N position and hold both raceway rings in proper relation.

It will be seen that the construction and arrangement of the ball bearings, as described, eliminates the usual inner raceway ring and permits a material reduction in the outside diameter of the hand piece, which is an important feature of the improvement in that it provides a ball bearing hand piece of a more convenient size.

The method of assembling the ball bearings on the spindle is an important feature of the improvement and will now be described with reference to Figs. 2 to 5 inclusive. The first step of assembling the ball bearing at the left end of the spindle is represented in Fig. 2, where it will be seen that the raceway ring E has been moved forward or toward the left until the spring washer N engages an outwardly projecting flange R on the spindle A. In this position, the balls D are inserted between the inner wall of the skirt L and the body of the spindle and are moved into the position shown in Fig. 3, where they are substantially in alignment with the annular ball race groove C. The raceway ring E and spring washer N are then moved to the position shown in Fig. 4, in which operation the shoulder K engages the balls D and seats them in the race groove C of the spindle A. The raceway ring may then be still further moved to the right, as shown in Fig. 5, to seat the balls against the thrust shoulder G, as shown in Fig. 1.

The proceeding for inserting the balls in the rear race groove C, at the right end of the spindle A, as shown in Fig. 1, is substantially the same as just described, except that the raceway ring F is moved from right to left after the balls have been placed about the spindle in the skirt L, the balls being similarly seated in the annular race groove C and in the raceway of the ring F by passing over the shoulder K.

After positioning the ball bearings the outer casing or shell B is moved to the right to bring the shoulder M into engagement with the spring washer N and the annular screw threaded collar P is screwed into the threads O so as to bring the face Q thereof into contact with the raceway ring F, to thereby properly space the respective raceway rings E and F in proper alignment with the corresponding ball race grooves C in the spindle A.

In this improved flexible shaft hand piece, the spindle A is shown as a solid arbor and provided at the rear end with a turned-down shouldered portion S, screw-threaded at T for the attachment thereto of a coupling attached to the flexible shaft. In the present instance, the flexible shaft U is provided with an end piece or coupling V, which is shown in Fig. 1 as provided with a threaded socket screwed on to the threaded end T of the spindle A.

It will be seen that the threaded collar P, which, as previously described, is adapted to engage the ball bearing ring F, is provided with an internally threaded bore at W, adapted to receive the threaded end of a coupling X, attached to the end of the sheath Y of the flexible shaft, substantially as indicated in Fig. 1, thus completing the attachment of the flexible shaft to the hand piece.

It will be seen that this improved attachment of the flexible shaft to the spindle enables a further reduction in the diameter of the handpiece by permitting the use of a smaller spindle and a more compact arrangement of the ball bearings.

Furthermore, it is evident that while the construction is more compact, it provides all the advantages of a double thrust ball bearing in a hand piece of smaller diameter than is ordinarily available.

While the improvement has been shown in the preferred form, it will be understood that the invention should not be limited to specific details shown for various modifications may be made without departing from the spirit and scope of the invention.

I claim:—

1. A flexible shaft hand piece comprising a spindle provided at each end with annular ball race grooves, annular raceway rings for cooperation with the respective spindle race grooves, balls adapted to be mounted in said spindle race grooves and said annular raceways, said raceway rings being provided with internal off-set shoulders adjacent and merging with a skirt portion of larger internal diameter than the raceways of the rings, adapted to hold the balls circumferentially of the spindle while introducing them into said spindle race grooves, said shoulders being adapted to seat the balls in the spindle race grooves by longitudinal movement of the respective raceway rings on the spindle.

2. A flexible shaft hand piece comprising a spindle provided with annular ball race grooves at each end thereof, intervening balls for cooperation with said grooves and annular raceway rings, the latter being provided on one peripheral edge with inwardly extending ball thrust shoulders merging with cylindrical race surfaces, said surfaces extending to outwardly off-set shoulders merging with skirt portions of larger internal diameter than said cylindrical race surfaces, said outer skirt portion being adapted to hold the balls circumferentially of the spindle as they are introduced into the respective race grooves thereof.

3. A flexible shaft hand piece comprising a spindle having annular ball race grooves at each end, balls cooperating with said spindle race grooves and annular raceway rings provided with thrust shoulders merging with cylindrical raceway surfaces for holding the balls in the respective race grooves of the spindle, said raceway rings being provided with off-set skirt portions of an internal diameter greater than said cylindrical race surfaces so as to permit the balls to enter circumferentially of the spindle and be transferred from said larger diameter skirt portions to said cylindrical raceway surfaces as the balls enter the respective race grooves of the spindle.

JOSEPH F. KELLER.